United States Patent [19]
Kocis

[11] Patent Number: 5,905,347
[45] Date of Patent: *May 18, 1999

[54] SYSTEM AND METHOD FOR CONTROLLING A COMPUTER DRIVE MOTOR

[75] Inventor: Thomas J. Kocis, Austin, Tex.

[73] Assignee: Dell USA, L.P., Round Rock, Tex.

[ * ] Notice: This patent is subject to a terminal disclaimer.

[21] Appl. No.: 08/093,224

[22] Filed: Jul. 16, 1993

[51] Int. Cl.⁶ ........................................ G06F 1/00
[52] U.S. Cl. ............................ 318/254; 318/599; 364/707
[58] Field of Search ..................... 318/254, 599, 318/811, 560, 812, 561; 307/64–66, 38; 360/72–78; 395/375, 750; 364/483, 557, 707; 388/811, 813; 371/37.1, 37.5, 38.1, 39.1

[56] References Cited

U.S. PATENT DOCUMENTS

| | | | |
|---|---|---|---|
| 4,712,196 | 12/1987 | Uesugi | 365/229 |
| 4,789,790 | 12/1988 | Yamanaka | 307/66 |
| 4,907,183 | 3/1990 | Tanaka | 364/707 |
| 4,984,185 | 1/1991 | Saito | 364/707 |
| 5,019,717 | 5/1991 | McCurry et al. | 307/66 |
| 5,079,437 | 1/1992 | Monroe | 307/38 |
| 5,167,024 | 11/1992 | Smith et al. | 395/375 |
| 5,184,025 | 2/1993 | McCurry et al. | 307/66 |
| 5,193,146 | 3/1993 | Kohno | 388/811 |
| 5,218,607 | 6/1993 | Saito et al. | 371/66 |
| 5,227,930 | 7/1993 | Thanos et al. | 360/78.04 |
| 5,230,055 | 7/1993 | Katz et al. | 395/750 |
| 5,230,074 | 7/1993 | Canova, Jr. et al. | 395/750 |
| 5,239,495 | 8/1993 | Nanno et al. | 364/707 |
| 5,241,546 | 8/1993 | Peterson et al. | 371/37.1 |
| 5,255,136 | 10/1993 | Machado et al. | 360/77.02 |
| 5,268,845 | 12/1993 | Startup et al. | 364/483 |
| 5,332,993 | 7/1994 | Ninomiya | 340/635 |
| 5,334,917 | 8/1994 | Lind | 318/254 |
| 5,345,392 | 9/1994 | Mito et al. | 364/483 |
| 5,349,668 | 9/1994 | Gladstein et al. | 395/750 |

*Primary Examiner*—Paul Ip
*Attorney, Agent, or Firm*—Skjerven, Morrill, MacPherson, Franklin & Friel LLP

[57] ABSTRACT

A battery powered computer system has a drive motor and a motor speed control. The motor speed control receives electrical power from an unregulated source in the computer, such as a battery. The motor speed control may include a pulse width modulator which pulsates received electric potential for use by the drive motor. The motor speed control may also contain control circuitry which controls the supply of pulsated electrical power to the drive motor. The control circuitry may also supply the pulsated voltage to the drive motor in duty cycles based on feedback from the drive motor to the control circuitry. For large voltage power supplies, the motor controller may have a voltage limiter to limit the maximum voltage from the power supply to the pulse width modulator.

10 Claims, 4 Drawing Sheets

SYSTEM AND METHOD FOR CONTROLLING A COMPUTER DRIVE MOTOR

BACKGROUND OF THE INVENTION

1. Field of the Invention

The present invention generally relates to motor drives in computer systems and, more particularly, to motor drives in battery powered computer systems.

2. Description of the Related Art

Battery powered computer systems, that is, computer systems that can be wholly empowered by a battery or batteries, are well known in the art of computer systems. One of the major advantages of battery powered computer systems is the fact that a user is able to operate such a system without having to be in the immediate vicinity of or to otherwise depend upon conventional stationary power sources such as 110 volt wall sockets. Thus, battery powered computer systems may be operated at many more locations than systems that must be connected to a stationary power source to operate. A second advantage of battery powered systems is that fact that they are generally made small and light, so as to be easily transportable. "Notebook sized" computers weighing about 3½ pounds, which can easily fit into a briefcase for travel, are presently not uncommon. Examples of battery powered computer systems include but are not limited to many laptop, notebook, pen-based, and sub-notebook systems.

A disadvantage of battery powered computer systems is the limited runtime of those systems. Runtime is defined as the amount of time for which the battery powered computer system can operate on its battery source (i.e., its battery or batteries) without replacing or recharging that source. There are two primary factors in determining runtime: battery capacity and power consumption rate. Battery capacity, or the amount of power that can be delivered by the battery source, generally relates to battery size among similar or identical types of batteries. Battery size among similar or identical types of batteries, in turn, generally relates to battery weight. Power consumption rate depends on the amount of power consumed by a given system, and the speed at which the given system consumes that power. Generally, the runtime of a battery powered computer system increases with an increase in battery capacity and/or with a decrease in power consumption rate.

Ideally, those skilled in the art would like to increase system portability (by reducing system size and weight) while increasing system runtime. Unfortunately, as may be gathered from the discussion above, attempting to increase system runtime by increasing battery capacity generally causes an increase in the size and weight of the system's battery source, which reduces portability. Thus, toward the goal of increasing battery powered computer system runtime, those skilled in the art have come to focus upon reducing the power consumption rate of battery powered computer systems. Ideally, decreases in power consumption rate can ultimately allow decreases in battery capacity (i.e., battery size and weight) with runtime still being acceptable.

One method of reducing the power consumption of a system is to reduce the power consumption of a component of that system. A component that consumes power within many battery powered computer systems is a drive motor. Battery powered computer systems typically contain drive motors to cause rotation for operation of media devices, such as hard disk drives and floppy disk drives. In a typical prior art battery powered computer system, a drive motor receives power from a motor controller, the motor controller receives power from a DC to DC converter, and the DC to DC converter receives power from a system power source. The system power source is usually the computer system's battery; however, power can be obtained from a temporary hook-up to a stationary power source such as a 110 volt wall socket that has been rectified into a DC power source. The DC to DC converter is typically a linear or switching regulator taking the power source and converting it to a preset DC voltage for use in the entire computer system. The motor controller typically contains a linear regulator further converting the DC to DC converted voltage into a voltage for use by the drive motor and for internal control circuitry for operating the drive motor.

To reduce the power consumption rate of drive motors, those skilled in the art have heretofore enabled motor controllers (via power management firmware) to shut down the drive motor after predetermined periods of inactivity. Such systems are equipped with a timing mechanism to track length of periods of time during which the drive is not used, and such systems are further equipped with structure for starting and stopping the drive motor. Once a drive is in a shut down state, a renewed need for use of the drive causes the system to restart or reactivate the drive motor. Once the drive is given a command to activate the motor, there is a delay in time until the drive motor reaches its operating speed. This delay is called the spin-up time delay. Although spin-up time delay is considered undesirable [primarily, because the driven structure (e.g., hard disk) is unusable until driven at its operating speed], the increased runtime obtained by reduced power consumption provided by shutting down the drive motor is usually considered to outweigh the undesirability of the delay. Still, minimizing the amount of spin-up time delay is an important, desired goal in the art.

Spin-up time delay is in part determined by the electrical potential supplied to the motor controller and the drive motor. The greater the amount of electric potential applied to the drive motor, the faster it "spins up". Existing battery powered computer systems supply voltage to the drive motor indirectly and to the motor controller directly from a DC to DC converter. A typical DC to DC converter supplies only 5 volts to the drive motor and the drive motor controller. It is a shortcoming and deficiency of the prior art that there is not an easy way to apply a greater amount of electrical potential than 5 volts to the drive motor.

Another disadvantage of the current methods for powering drive motors is power loss in the DC to DC converter. As previously explained, the DC to DC converter takes voltage from a source such as the system battery and changes the voltage from that source into a voltage for use by the computer system. The typical efficiency for existing DC to DC converters is about 90%. This means that about 10% of the energy taken from the power source is lost, principally as heat. It is a shortcoming and deficiency of the prior art that current methods for powering drive motors have this power loss.

A further disadvantage of the current methods for powering a drive motor is power loss in the motor controller. In addition to controls for the motor, the motor controller contains a linear regulator for converting the DC voltage from the DC to DC converter into a voltage for use by the motor. For example, the linear regulator within the motor controller may receive a voltage (such as 5 volts) from the DC to DC converter (drawing 1 amp) and convert that voltage into a voltage (such as 3 volts) for use in the drive motor. In this example, two watts of power are lost in the linear regulator (generally as heat). It is a shortcoming and deficiency of the prior art that current methods for powering drive motors have this power loss.

Based upon the foregoing, it should be appreciated that there are a number of significant shortcomings and deficiencies in the art that have heretofore contributed to spin-up time delays incurred in the interest of increasing system runtime. These shortcomings and deficiencies include no provisions for applying higher voltages to drive motors, no provisions for eliminating power losses in the DC to DC converter in the source-converter-controller chain that empowers the drive motor, and no provisions for eliminating power losses in the motor controller in the source-converter-controller chain that empowers the drive motor.

SUMMARY OF THE INVENTION

To overcome the aforementioned shortcomings and deficiencies, the present invention generally provides an improved system and method for powering a drive motor in a battery powered computer system. A broad object of the present invention is to reduce the spin-up time for a drive motor in a battery powered computer system. Toward achieving that broad object, the present invention provides solutions to each of the shortcomings and deficiencies discussed in the description of related art section above.

Accordingly, an object of the present invention is to provide a system and method for powering a drive motor wherein potentials greater than 5 volts (i.e., the typical output of a conventional DC to DC converter in a battery powered computer system) can be easily applied to a drive motor.

Another object of the present invention is to provide a system and method for powering a drive motor wherein power losses associated with use of a DC to DC converter are eliminated.

Yet another object of the present invention is to provide a system and method for powering a drive motor wherein power losses associated with use of a linear regulator within a motor controller are eliminated.

In one aspect of the invention, a media unit (including a drive motor and a motor controller) receives an electric potential from a source or sources other than the DC to DC converter. One example of such a source could be the battery powering the computer system. The potential of batteries within typical battery powered computer systems varies from about 4.8 volts to about 17 volts, but their potential is generally greater than 5 volts. A drive motor receiving an electric (or "supply") potential directly from a system battery having a potential greater than 5 volts will generally have a shorter spin-up time than a drive motor receiving a supply potential only from a 5V DC to DC converter.

In another aspect of the invention, in embodiments wherein a high voltage source is used to empower a drive motor, structure is included to pulse the power to the drive motor, to reduce power losses. Underlying this aspect of the invention is the fact that the drive motor controller is not as sensitive to voltage variations as other components in the computer system. The drive motor can operate on higher voltages pulsed at small increments which average over time to the correct voltage for the drive motor. During the pulse period that the higher voltage is transferred to the drive motor, no regulation of power is required; therefore, no heat loss occurs. During the pulse period that no voltage or power is transferred to the drive motor, no voltage or power is used from the power source; therefore, no loss occurs.

Combining the two aspects mentioned above, it is possible according to the teachings of the present invention to power a drive motor in a battery powered computer system with pulse modulated voltage from a "high" (i.e., greater than 5 volts) power supply, such as a system battery. In such embodiments, the motor controller can modulate the current for use by the drive motor. Further, in such embodiments, the drive motor spin-up time is reduced and power losses due to inefficiencies of the D.C. to D.C. converter are eliminated. By using a pulse width modulator in the motor controller (or "motor speed control", another name by which this component is known), the voltage output of the alternate power source is converted into a voltage useable by the drive motor without the losses associated with a linear regulator.

In another aspect of the present invention, the motor controller has control circuitry which controls the power from the pulse width modulator to the drive motor. This control circuitry can receive feedback from the drive motor and supply voltage from the pulse width modulator to the drive motor in greater or lessor duty cycles based upon the feedback from the drive motor.

In a yet another aspect of the present invention, the motor controller contains a voltage limiter. The voltage limiter ensures that the power from the power source does not exceed a maximum voltage that the drive motor can use in pulsated form from the pulse width modulator. Normally, the drive motor can operate on pulsated power from the maximum power source in a battery powered computer system; however, by limiting the maximum voltage of the power source all risk of overpowering the drive motor is removed and the drive motor and drive controller circuitry can receive electrical power from an even greater variety of power sources.

The present invention also provides a method for powering a drive motor in a computer system powerable by a battery, which drive motor must be spun up when starting. The provided method includes the steps of electrically connecting the drive motor and the battery so that the drive motor can be powered by the battery via an electrical connection; and controlling the electrical connection so that the connection may be made and unmade, and so that the connection is made when the drive motor is spun up.

In embodiments of the method of the present invention, the battery may provide an electric potential, and the method may further include the step of pulsating the electric potential provided by the battery. Further, in embodiments of the method of the present invention, the pulsated electric potential may have pulse durations, and the method may further include the step of controlling the pulse durations by lengthening them to increase power delivery to the drive motor and by shortening them to decrease power delivery to the drive motor. Still further, embodiments of the method of the present invention may also include the step of limiting the electric potential if and when it exceeds a maximum electric potential which the drive motor can accept for proper operation.

Based upon the foregoing, it should be understood and appreciated that the present invention offers a number of advantages over prior art systems and methods. One advantage is the fact that spin-up time delays of drive motors are reduced because alternate, higher voltage supplies are tapped to empower the drive motor. Another advantage of embodiments of the present invention is the fact that system inefficiencies in the form of DC to DC converter and motor controller power losses are reduced or eliminated. Yet other advantages involve worry free use of a wide variety of power supplies, based upon implementation of pulse width modulation techniques, together with use of a voltage limiter.

BRIEF DESCRIPTION OF THE DRAWINGS

For a more complete understanding of the present invention, and for further objects and advantages thereof, reference may now be made to the following detailed description taken in conjunction with the accompanying drawings wherein.

DETAILED DESCRIPTION OF THE INVENTION

Figure 1:
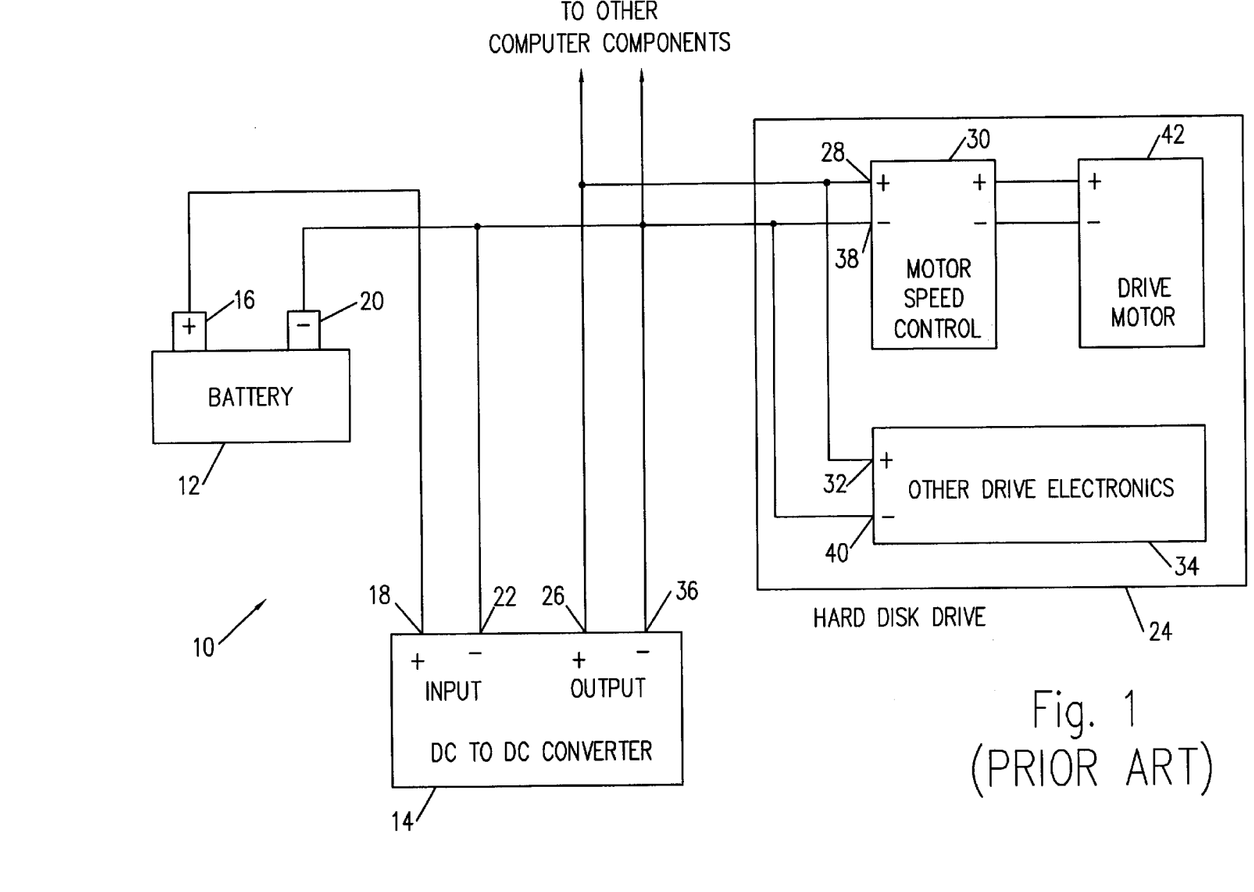
FIG. 1 is a block diagram of a general architectural structure used by a prior art computer for powering a drive motor.

Referring now to the drawings wherein like or similar elements are designated with identical reference numerals throughout the several views and, more particularly, to FIG. 1, there is shown a block diagram of a general architectural structure used in prior art battery powered computer systems to power drive motor assemblies. Various aspects of this structure are discussed immediately below. Purposes of this discussion are to describe an environment in which the teachings of the present invention may usefully be applied and to provide general background as to the operation of prior art drive motor controls; this discussion is not meant to be, nor should it in any way be construed to be, limiting of the scope of the present invention.

With reference to FIG. 1, a prior art battery powered computer system 10 may be seen to include a battery 12 connected to a DC to DC converter 14. This connection is manifested by a positive terminal 16 of the battery 12 being connected to a positive input terminal 18 of the DC to DC converter 14 and, further, by a negative terminal 20 of the battery 12 being connected to a negative input terminal 22 of the DC to DC converter 14. Referring still further to FIG. 1, it may be seen that the DC to DC converter 14 is also connected to a hard disk drive element 24. This connection is manifested in a positive output terminal 26 of the DC to DC converter 14 being connected to a positive input terminal 28 of a motor speed control 30 (discussed further below) portion of the hard disk drive element 24, and by the positive output terminal 26 also being connected to a positive input terminal 32 of an other drive electronics 34 (also discussed further below) portion of the hard disk drive element 24. Still further, the DC to DC converter 14 and the hard disk drive element 24 connection shown in FIG. 1 is manifested in a negative output terminal 36 of the DC to DC converter 14 being connected to a negative input terminal 38 of the motor speed control 30 and to a negative input terminal 40 of the other drive electronics 34. It may also be seen in FIG. 1 that the negative output terminal 20 of the battery 12, the negative output terminal 36 of the DC to DC converter 14, the negative input terminal 38 of the motor speed control 30, and the negative input terminal 40 of the other drive electronics 34 are all electrically connected.

The computer system 10, the battery 12 and the DC to DC converter 14 shown in FIG. 1 are all conventional. As mentioned in the description of related art section above, the computer system 10 could be a notebook system, a subnotebook system, a pen-based system, or the like. The battery 12 could be any of a multitude of batteries that may be employed to empower such systems 10. As previously mentioned, conventional batteries employed in battery powered computer systems supply from about 4.8 volts to about 17 volts, and they generally supply more than 5 volts. Likewise, the DC to DC converter 14 is conventional and being so, provides about 5 volts output.

Further, with respect to the DC to DC converter 14, it is worth noting at this point that although a 5 volt output is presently conventional, an industry move appears to be underway to even a lower output: 3.3 volts. If this move is ultimately made, implementing the system and method of the present invention will become even more necessary or worthwhile, for reasons that will become apparent during the reading of this description.

Referring still to FIG. 1, the hard disk drive element 24 may be seen to comprise the speed control 30, the other drive electronics 34, and a drive motor 42. The other drive electronics 34 generally includes such items as a head for reading a hard disk and circuitry for communicating data read from the hard disk to other computer system components via address and data buses (not shown) 10. Power to the other drive electronics 34 comes from the DC to DC converter 14.

Figure 2:
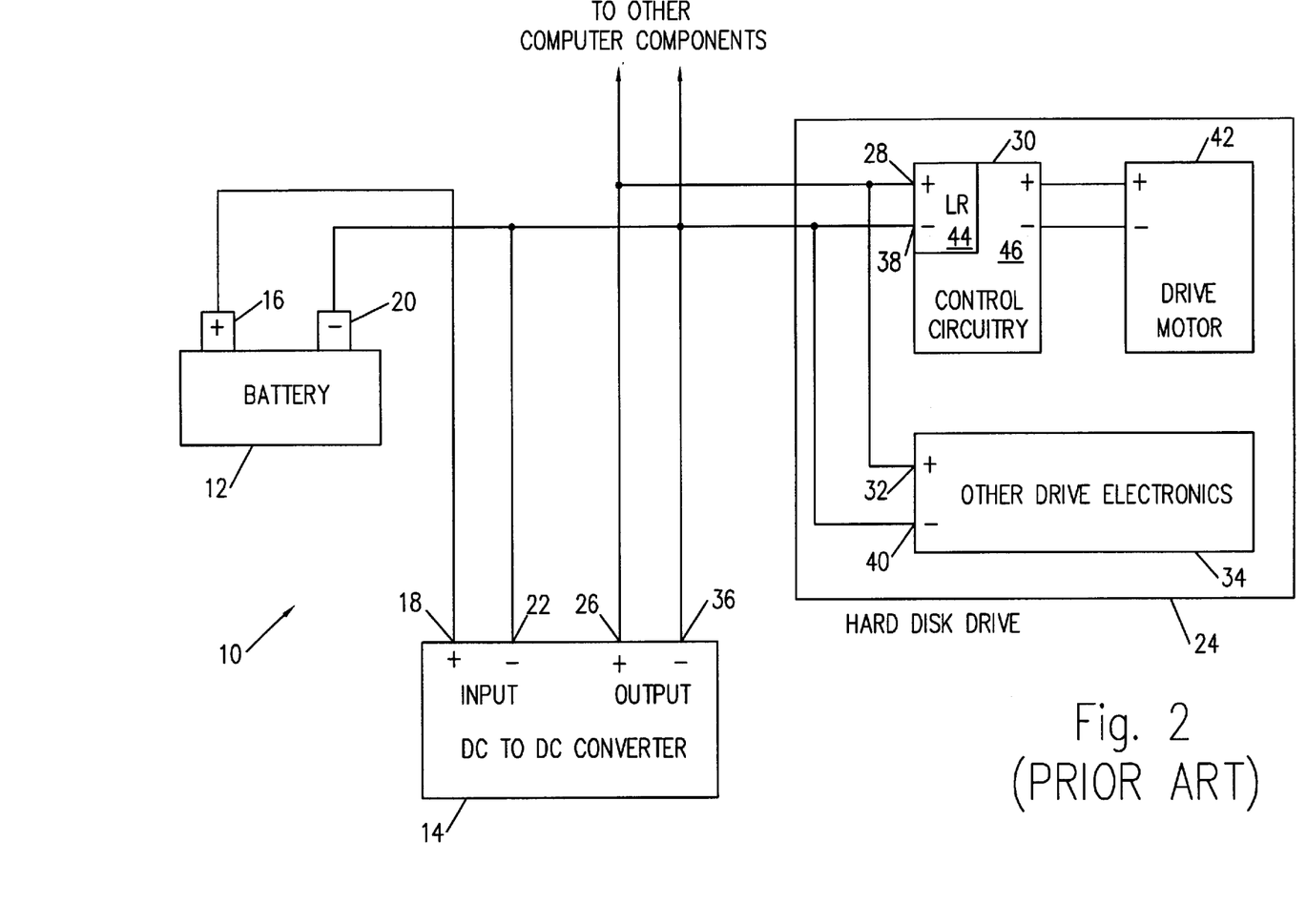
FIG. 2 is a more detailed block diagram of a general architectural structure used by a prior art computer for powering a drive motor.

Referring now to FIG. 2, there is shown a more detailed block diagram of a general architectural structure used in prior art battery powered computer systems to power drive motor assemblies. The more detail resides in the depiction of the motor speed control 30, which is shown in FIG. 2 to comprise a linear regulator (LR) 44 and control circuitry 46. The purpose of the linear regulator 44 is to convert voltage received from the DC to DC converter 14 to a voltage useable by the drive motor 42. The purpose of the control circuitry 46 is to activate and deactivate the drive motor 42, and to control the speed of the motor.

FIG. 2 omits many details regarding hard disk drive element structure. The level of detail provided herein, however, is considered to be enough to enable those skilled in the art to practice the present invention. Conner Peripherals and Quantum, for example, are two companies well known for manufacturing such drives. By way of example only, the Quantum Go·Drive 60/120AT would be a perfectly suitable hard disk drive to be incorporated into an embodiment of the present invention. Such drives are known by those skilled in the art to be microprocessor controlled, to have multi-function drive controllers, a motor driver, means for sensing spindle motor rotation velocity, and the like. Thus, concepts discussed herein can be readily practiced by those skilled in the art. The same is true for other rotating media devices, such as floppy disk drives.

Continuing to refer to FIG. 2, it will be recalled from the discussion in the related art section above that the linear regulator 44, like the DC to DC converter 14, has an efficiency rating of less than 100%.

During operation of the prior art structure shown in FIG. 2, during long periods of inactivity, the system will cause the control circuitry 46 of the motor speed control 30 will shut off power from the linear regulator 44 to the drive motor 42, allowing the drive motor 42 to come to rest. When a renewed request for the hard disk drive 24 is made by the computer system 10, the control circuitry 46 reconnects the linear regulator 44 to the drive motor 42. The drive motor 42 must then use power from the linear regulator 44 to spin-up to operating speed and to maintain that speed.

Spin-up time for the drive motor 42 is greatly dependent upon the power available to the drive motor 42. It can be seen from FIG. 2 that the method of powering the drive motor 42 in the prior art battery powered computer system 10 has losses of efficiency due to the method of transferring power from the battery 12 to the drive motor 42. For the drive motor 42 to receive power, power from the battery 12 must first pass through the DC to DC converter 14 with its efficiency losses and then through the linear regulator 44 of the motor speed control 30 which also has efficiency losses. The losses from these two components contribute to an increased rate of power consumption and, hence, to a decreased runtime.

Figure 3:
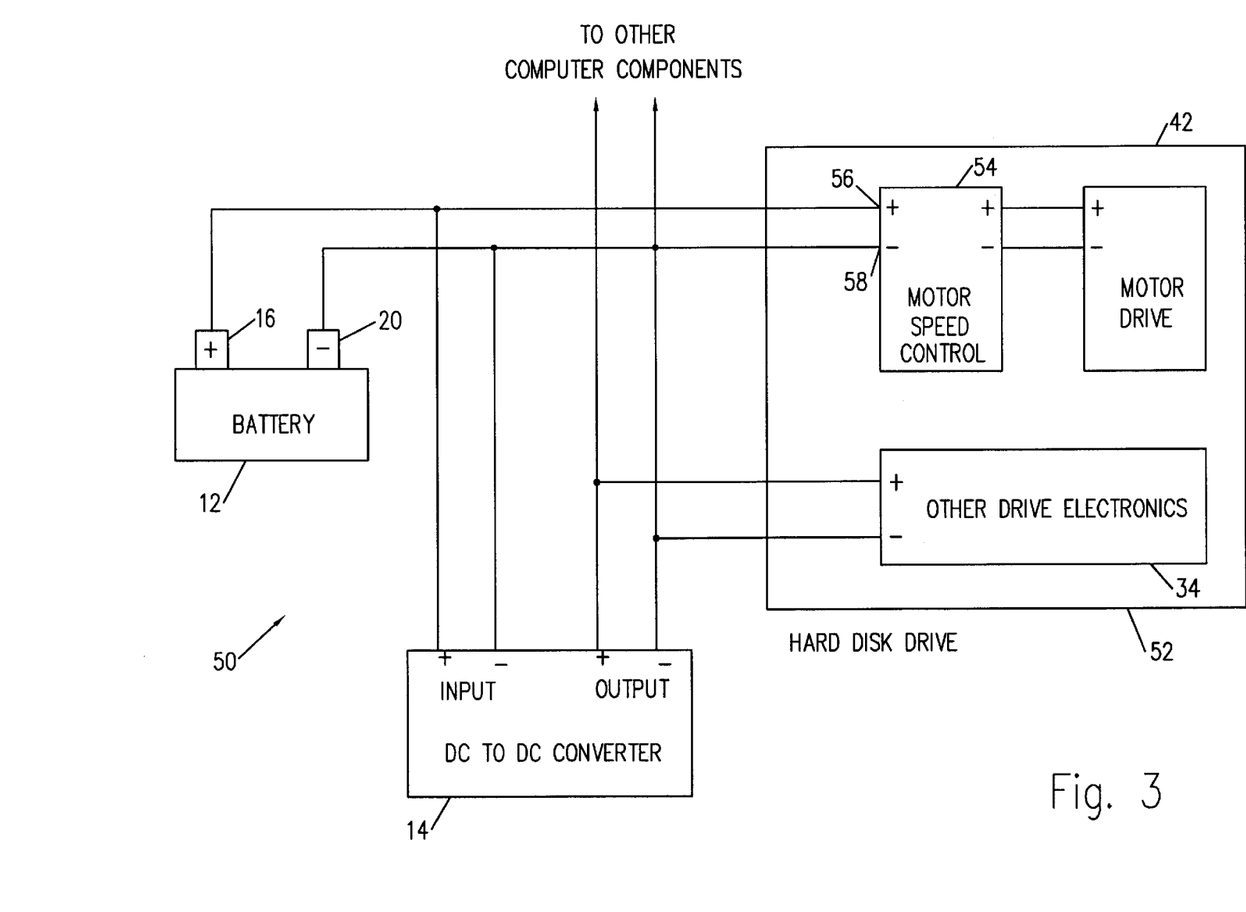
FIG. 3 is a block diagram of a general architectural structure according to the teachings of the present invention for powering a drive motor in a battery operated computer system.

Referring now to FIG. 3, there is shown a battery powered computer system 50 according to the teachings of the present invention. The battery powered computer system 50 may be seen in FIG. 3 to comprise a battery 12, a DC to DC converter 14 and a hard disk drive element 52. There are a number of important differences between the elements of FIG. 3, and how they are interconnected, and the elements of FIG. 1 and 2, and how they are interconnected. The most significant difference relates to how the hard disk drive element 52 is empowered. Like the hard disk drive element 24 in FIG. 1, the hard disk drive element 52 in FIG. 2 comprises a motor speed control 54, a drive motor 44 and other drive electronics 34; however, the motor speed control 54 differs from the motor speed control 30 in FIG. 1 because it is empowered directly by the battery 12. That is, the positive terminal 16 of the battery 12 is electrically connected to a positive input terminal 56 of the motor speed control 54 and the negative terminal 20 of the battery 12 is electrical connected to a negative input terminal 58 of the motor speed control 54.

The above described "most significant difference" is so for several reasons. First, the fact that the battery 12 is directly connected to the motor speed control 54 means that the DC to DC converter, with its efficiency loss, is not in the drive motor empowering chain. This is a significant improvement. Secondly, the battery 12 will almost always, as previously mentioned, have a higher voltage output than the DC to DC converter 14. Thus, the fact that the battery 12, rather than the DC to DC converter 14, is directly connected to the motor speed control 54, which can thereupon directly connect the supplied potential to the drive motor 42, virtually ensures that a higher potential can ultimately applied to the drive motor 42. As drive motor spin-up time delay decreases as potential increases, this also constitutes a significant improvement.

At this point it may be recalled that the computer industry appears to be moving from a 5 volt to a 3.3 volt main supply. If that move is completed, the impact of the present invention will be even more marked, as even larger relative potentials can be applied to drive motors to spin them up.

Figure 4:
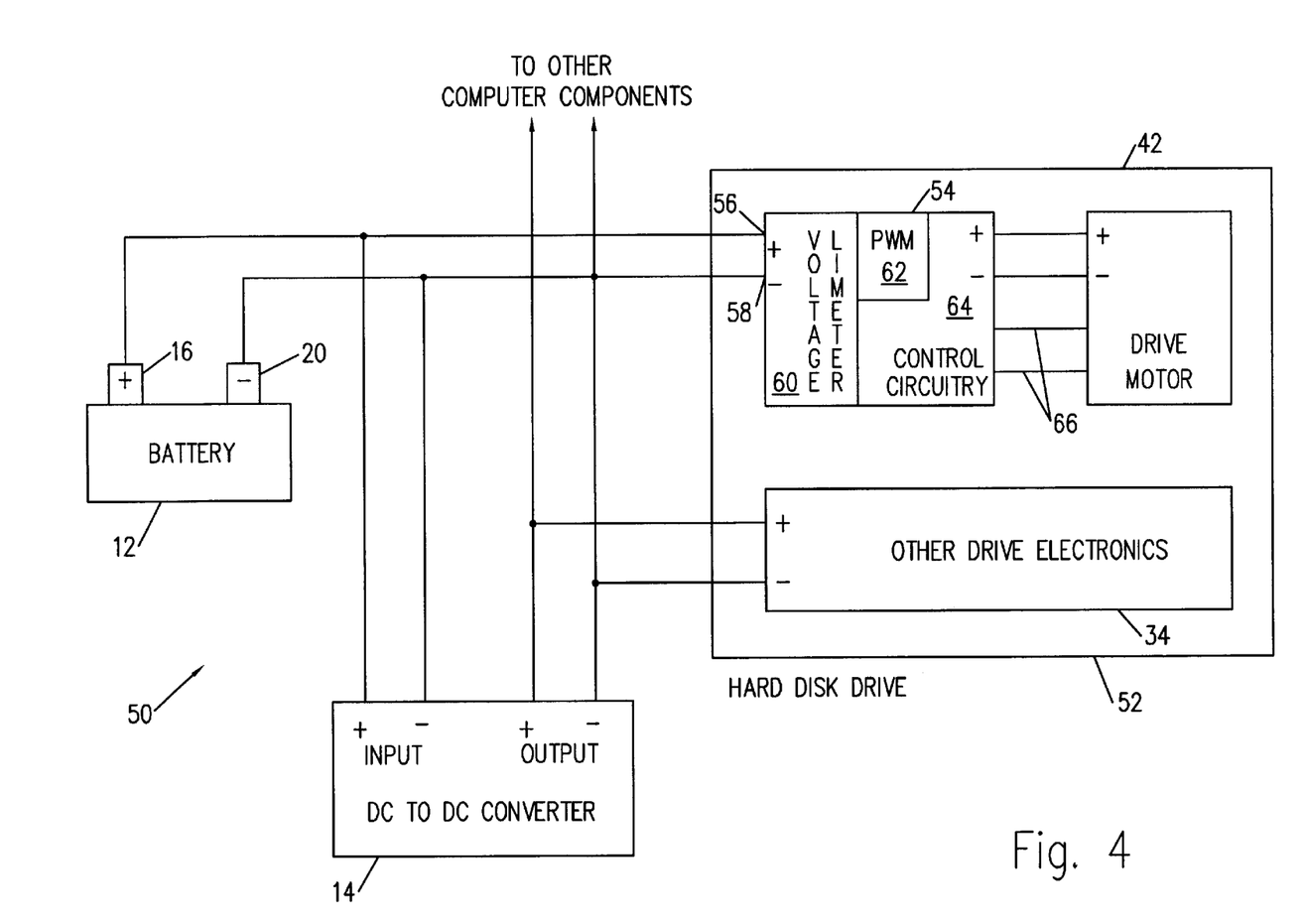
FIG. 4 is a more detailed block diagram of a architectural structure according to the teachings of the present invention for powering a drive motor in a battery operated computer system.

There are other important differences between the elements of FIGS. 3 and those of FIGS. 1 and 2, which are best seen in FIG. 4.

Referring now to FIG. 4, there is shown a more detailed view than shown in FIG. 3 of an embodiment of the present invention. As with FIGS. 2 and 1, the difference between FIG. 4 and 3 resides in the motor speed control. In FIG. 4, the motor speed control 54 may be seen to comprise a voltage limiter 60, a pulse width modulator (PWM) 62, and control circuitry 64. The pulse width modulator 62 modulates or pulsates the electric potential received by the motor speed control 54 so that the average voltage over time leaving the motor speed control 54 is a voltage usable by the drive motor 42. As those skilled in the art are well aware, as an induction type device, the drive motor 42 can operate on pulsated power at larger voltages than most, if not all, other computer system components. However, there may be a maximum pulsated voltage on which the power controlling elements and drive motor 42 can operate. If potential from the battery 12, or alternate power source, exceeds the maximum voltage that the elements and drive motor 42 can operate on in pulsated form, the voltage limiter 60 will limit that potential before it reaches the pulse width modulator 62. In most instances the voltage limiter 60 will not act because the power sources in most battery powered computer systems will have voltages within the maximum range of the drive motor 42. However, when necessary, the voltage limiter 60 will allow the drive motor 42 to operate off of an even greater variety of alternate power sources.

The control circuitry 64 of the motor speed control 54 allows the voltage from the pulse width modulator 62 to pass to the drive motor 42 during periods of demand for the hard disk drive element 52. The control circuitry 64 transmits potential from the pulse width modulator 62 to the drive motor 42 in duty cycles based on feedback from the drive motor 42 sent to the control circuitry 64 through feedback wires 66. This feedback is usually an indication of the speed that the drive motor 44 is operating. This feedback may be generated by conventional rotational speed sensing devices. When the drive motor 42 is operating below operating speed, which the control circuitry 64 can detect via feedback wires 66, the control circuitry 64 can increase the duty cycle of voltage pulses transmitted from the pulse width modulator 62 to the drive motor 42. Once the drive motor 42 reaches optimum drive speed, the control circuitry 64 can reduce the duty cycle of voltage pulses from the pulse width modulator 62 to the drive motor 42. This process reduces the power consumption rate and increases the computer system 50 runtime.

During long periods (as those skilled in the art are aware, hard disk time out periods typically vary from about 30 seconds to 6 minutes; thus a "long" period of time can be as short as 30 seconds or less, to an infinitely long period of time) of hard disk drive inactivity, the control circuitry 64 will stop providing power from the pulse width modulator 62 to the drive motor 42. The power to the drive motor 42 is temporarily cut in order to reduce the power consumption rate of the drive motor 42 when not in use, thereby increasing runtime for the computer system 50. Upon a renewed demand for the drive motor 42, the control circuitry 64 will once again permit power to pass from the pulse width modulator 62 to the drive motor 42. Because the drive motor 44 will be at rest, the control circuitry 64 will increase the duty cycle of the pulse width modulated voltage from the pulse width modulator 62 to the drive motor 42. Although variations are possible, the duty cycle would likely be increased to 100% possible, so that all power is available for spin up. This 100% figure contrasts to an steady state duty cycle, which would be substantially less, on the order of ½ or ⅓ the amount possible. Those skilled in the art are well aware that actual duty cycles will likely depend upon the input voltage and, further, that duty cycles amount will likely increase as applied voltage decreases. Actual amounts can vary considerably but can readily be determined by those skilled in the art based upon the particular components (e.g., the pulse width modulator) finally selected for use. Power will pass directly from the battery 12 through the voltage limiter 60 (with no effect if the voltage is below the preselected maximum, e.g., 20 volts, although the actual limit will vary upon the components used and their particular, and easily determinable, protection requirements), through the pulse width modulator 62, to the drive motor 42. This process increases the available power to the drive motor 42 thereby decreasing spin-up time for the drive motor 42 to reach optimum operating speed.

Referring now to FIGS. 2 and 4 in combination, a comparison can be made between the method used for powering the drive motor 42 in the prior art battery powered computer system 10 and the method of powering the drive motor 42 in the battery powered computer system 50. It can be seen that in order for the drive motor 42 of the prior art battery powered computer system 10 to receive power, power must flow from the battery 12, through the DC to DC converter 14, and also through the linear regulator 44 in the motor speed control 30. When at rest, the spin-up time for the drive motor 42 to reach optimum speed is greatly influenced by the amount of available power. Both the DC to DC converter 14 and the linear regulator 30 have voltage decreases and efficiency losses. These voltage decreases and efficiency losses reduce the amount of power available to the drive motor 42, thereby increasing spin-up time and power consumption.

In contrast, in order for the drive motor 42 of the battery powered computer system 50 to receive power from the battery 12, the power need only pass through the motor speed control 54. The pulse width modulator 62 of the motor controller 54 is a type of switching regulator which pulsates the voltage in order to obtain an output voltage for the drive motor 42 which averages over time to the optimum power for the drive motor 42. Because the pulse width modulator 62 is a switching type regulator, there are minimal efficiency losses associated with it. This is in stark contrast to linear type regulators wherein there are marked efficiency losses can be experienced. Because these aforementioned losses are eliminated, the power available to the drive motor 42 of the computer system 50 is not decreased significantly by any components between the drive motor 42 and the battery 12, allowing the drive motor 42 to have greater power available and reducing the spin-up time required.

Furthermore, the method of powering the drive motor 42 at speed in the battery powered computer system 50 requires less power than is required for the method of powering the drive motor 42 at speed in the prior art battery powered computer system 10. In the battery powered computer system 10, power passes from the battery 12, through the DC to DC converter 14, and through the linear regulator 44 of the motor speed control 30 before reaching the drive motor 42. The efficiency losses of the DC to DC converter 14 and the linear regulator 44 place an additional power requirement on the battery 12 over what is necessary to power the drive motor 42. This additional power requirement increases the power usage rate of the computer system 10 thereby reducing the runtime for a battery powered computer.

In contrast, in practice of the method for powering the drive motor 42 in the battery powered computer system 50, power from the battery 12 passes only through the motor controller 54 before reaching the drive motor 42. By powering the drive motor 42 without passing power through the DC to DC converter 14, the battery 12 does not need to provide extra power for the efficiency losses of the DC to DC converter 14. Furthermore, the pulse width modulator 62 of the motor speed control 54 is not a linear type device but a switching type device; therefore, it loses a minimal amount of power in operation. The result of all of these changes is that the normal speed operation of the drive motor 42 requires less power from the battery 12 in the battery powered computer system 50 than is required from the battery 12 of the prior art battery powered computer system 10 to operate the drive motor 42 at normal operating speeds. By requiring less power, the battery powered computer system 50 will have a longer runtime than the prior art battery powered computer system 10.

The present invention therefore provides a new and improved method of powering a drive motor in a battery powered computer system which not only reduces spin-up time for a drive motor at rest, but in addition, also reduces the power required from the battery to operate the drive motor when operating at normal rotational speeds. The reduction in spin-up time reduces the amount of time the user must wait for the drive motor to reach operating speed when the drive motor is started or restarted. The reduction in power consumption rate increases system runtime and provides the user with longer period of use of the battery powered computer system between battery charges or replacements.

Obviously, numerous modifications and variations are possible in view of the above teachings. For example, whereas the motor speed control 54 in FIGS. 3 and 4 is depicted as drawing power only from a single battery 12, any other power source (such as an AC adapter source) or even a combination of several sources could be used to empower the motor speed control 54 in embodiments of the present invention. Also, although the present invention is presented herein as a drive motor control mechanism, the teachings of the present invention could theoretically be applied to any computer component that could benefit therefrom. Such components would likely have some sort of delay in starting and/or would contain at least a subsystem that requires power supplied at other than a constant voltage. Other modifications and variations are possible. Accordingly, within the scope of the appended claims, the present invention may be practiced otherwise than as specifically described herein.

What is claimed is:

1. A computer system comprising:

a media device, which media device may be driven;

a drive motor connected to said media device, which drive motor operates to rotationally drive said media device and which drive motor has an input terminal capable of receiving power to enable said drive motor to operate;

a battery having an output terminal on which a first electric potential is provided;

a motor speed control circuit connected electrically between said drive motor and said battery, said motor speed control circuit capable of applying said first electric potential provided on said first output terminal of said battery to said input terminal of said drive motor, wherein said motor speed control circuit includes means for ensuring that said first electric potential provided on said output terminal of said battery does not exceed a maximum electric potential that can be accepted by said drive motor before applying said first electric potential to said input terminal of said drive motor;

a DC to DC converter electrically connected to said battery, and having an output terminal at which a second electric potential is provided wherein said second electric potential is lower than said first electric potential; and a drive electronics circuit coupled to said output terminal of said DC to DC converter for reading data stored on said media device;

whereby said drive electronics circuit receives power provided through said output terminal of said DC to DC converter and whereby said drive motor is powered independent of said DC to DC converter.

2. The computer system as recited in claim 1, wherein said motor speed control circuit comprises a modulator capable of pulsing said first electric potential provided to said input terminal of said drive motor.

3. The computer system as recited in claim 1, wherein said means for ensuring that said electric potential provided on said output terminal of said battery does not exceed said maximum electric potential comprises a voltage limiter connected in circuit between said battery and said drive motor.

4. A method for powering a drive motor in a computer system powerable by a battery, which drive motor must be spun up when starting, said method comprising the steps of:

providing a first electric potential from said battery to said drive motor through a modulator to thereby rotationally drive said drive motor;

pulsating said first electric potential provided to said drive motor from said battery;

controlling a pulse duration associated with said first electric trial provided to said drive motor by lengthening aid pulse duration to increase power delivery to said drive motor and by shortening said pulse duration to decrease power delivery to said drive motor;

generating a second electric potential within a DC to DC converter wherein an input terminal of said DC to DC converter is coupled to receive power from said battery and wherein said second electric potential has an amplitude that is less than said first electric potential; and providing said second electric potential from said DC to DC converter to a drive electronics circuit, wherein said drive electronics circuit is configured to read data stored on a media device driven by said drive motor.

5. The method as recited in claim 4, wherein said drive motor has a maximum electric potential which it can accept for proper operation, and further comprising the step of limiting said first electric potential if and when it exceeds said maximum electric potential.

6. A portable computer system comprising:

a disk drive including a drive motor for spinning a data storage disk, which drive motor has an input terminal to which an electric potential may be applied to enable it to operate;

a battery having an output terminal on which a first output voltage is provided;

a switching regulator, said switching regulator connected in circuit between said output terminal of said battery and said input terminal of said drive motor, said switching regulator receiving said first output voltage from said battery, pulsating said first output voltage, and thereby providing said first output voltage to said input terminal of said drive motor to enable it to operate;

a DC to DC converter electrically connected to said battery, wherein said DC to DC converter includes an output terminal at which a second output voltage which is lower than said first output voltage is provided;

a drive electronics circuit coupled to said output terminal of said DC to DC converter for reading data stored on said media device;

whereby said drive electronics circuit receives power through said output terminal of said DC to DC converter and whereby said drive motor is powered independent of said DC to DC converter; and wherein a duty cycle of said first output voltage controls a speed of rotation of said drive motor.

7. The portable computer system as recited in claim 6, wherein said switching regulator is a pulse width modulator.

8. The portable computer system as recited in claim 6, wherein said drive motor has a maximum pulsated voltage on which it can operate, and further comprising a voltage limiter connected in circuit between said battery and said switching regulator, which voltage limiter operates to limit the electrical potential applied to said drive motor so that said maximum pulsated voltage of said drive element is not exceeded.

9. The portable computer system as recited in claim 6, wherein said disk drive is a hard disk drive.

10. The portable computer system as recited in claim 6, wherein disk drive is a floppy disk drive.

* * * * *